US011902094B1

(12) United States Patent
Puri et al.

(10) Patent No.: US 11,902,094 B1
(45) Date of Patent: Feb. 13, 2024

(54) SYSTEMS AND METHODS FOR END-TO-END AUTOMATION OF NETWORK INFRASTRUCTURE DEVELOPMENT CHANGES

(71) Applicant: BANK OF AMERICA CORPORATION, Charlotte, NC (US)

(72) Inventors: Anmol Puri, Haryana (IN); Nusrath Fathima, Telangana (IN); Srikanth Gonda, Telangana (IN); Lingaraj Gopalakrishnan, Tamilnadu (IN); Kommu John Bilton, Telangana (IN); Ashok Kumar, Telangana (IN); Avinash Basavant Nigudkar, Maharashtra (IN); Shalu Wadhwa, Haryana (IN); Narsing Raj, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/228,536

(22) Filed: Jul. 31, 2023

(51) Int. Cl.
*H04L 41/08* (2022.01)
*H04L 41/0866* (2022.01)
*H04L 41/16* (2022.01)
*H04L 41/0631* (2022.01)

(52) U.S. Cl.
CPC ...... *H04L 41/0886* (2013.01); *H04L 41/0631* (2013.01); *H04L 41/0866* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 8,543,665 | B2 | 9/2013 | Ansari et al. |
| 9,450,823 | B2 | 9/2016 | Arora et al. |
| 9,667,495 | B2 | 5/2017 | Van Der Merwe et al. |
| 9,712,486 | B2 | 7/2017 | Johnson et al. |
| 9,722,951 | B2 | 8/2017 | Almadi |
| 10,411,964 | B2 | 9/2019 | Zhang |
| 10,768,920 | B2 | 9/2020 | Fontoura et al. |
| 10,938,653 | B2 | 3/2021 | Sadana et al. |
| 10,999,189 | B2 | 5/2021 | Musku et al. |
| 11,153,152 | B2 | 10/2021 | Siddiqi et al. |
| 11,153,171 | B2 | 10/2021 | Vadapalli et al. |
| 11,218,376 | B2 | 1/2022 | Jain et al. |
| 11,223,536 | B2 | 1/2022 | Aftab et al. |
| 11,316,688 | B2 | 4/2022 | Ansari et al. |
| 11,336,511 | B2 | 5/2022 | Johnson et al. |
| 11,457,365 | B2 | 9/2022 | Ashrafi |

(Continued)

*Primary Examiner* — Quang N Nguyen
(74) *Attorney, Agent, or Firm* — Moore & Van Allen PLLC; Nicholas C. Russell

(57) ABSTRACT

Systems, computer program products, and methods are described herein for end-to-end automation of network infrastructure development changes. The present disclosure is configured to collect and archive data comprising feature logs, resource logs, and events in a central historical data storage. This data is subsequently normalized and events are correlated to specific features. This correlation involves locating differences in pre and post-deployment feature performance, which includes resource utilization, and maintaining a history of the analyzed data in the central historical data storage.

18 Claims, 6 Drawing Sheets

(56) References Cited

U.S. PATENT DOCUMENTS

| | | |
|---|---|---|
| 11,516,139 B2 | 11/2022 | Ismailsheriff et al. |
| 11,671,331 B2 | 6/2023 | Ramanathan et al. |
| 2018/0198692 A1 | 7/2018 | Ansari et al. |
| 2021/0302923 A1 | 9/2021 | Strohmenger et al. |
| 2022/0387896 A1* | 12/2022 | Warner ............... A63F 13/80 |
| 2023/0057193 A1 | 2/2023 | Ansari et al. |
| 2023/0128700 A1* | 4/2023 | Maes .................. G06Q 10/06 705/301 |
| 2023/0140918 A1* | 5/2023 | Saxena ............ G06Q 10/0635 705/7.27 |
| 2023/0236923 A1* | 7/2023 | Gowri ............... G06F 11/0709 714/4.1 |

* cited by examiner

SYSTEMS AND METHODS FOR END-TO-END AUTOMATION OF NETWORK INFRASTRUCTURE DEVELOPMENT CHANGES

TECHNOLOGICAL FIELD

Example embodiments of the present disclosure relate to systems and methods for end-to-end automation of network infrastructure development changes.

BACKGROUND

Applicant has identified a number of deficiencies and problems associated with end-to-end automation of network infrastructure development changes. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for end-to-end automation of network infrastructure development changes. in a continually expanding service industry of information technology, developers currently employ both information technology service management (ITSM), which are a set of industry standards, and development operations (DevOps), which are a robust framework for development. However, these two methodologies often fail to work in harmony. DevOps, known for its agility and flexibility, revolutionizes traditional IT approaches. Conversely, ITSM enforces a disciplined strategy and meticulous processes to guarantee foolproof deployment.

The turn around time (TAT), which refers to the period necessary to complete a process or fulfill a request, varies significantly between the two methodologies. With ITSM's cautious and methodical approach, deploying new enhancements to customers often takes longer, leading to an extended time to market. On the other hand, the agility of DevOps allows for a faster TAT. By integrating the robust procedures of ITSM with the nimbleness of DevOps, the present invention creates a solution that offers best-in-class results and breaks down the existing barriers between ITSM and DevOps.

The present invention provides a tool that leverages artificial intelligence (AI), machine learning (ML), and robotic process automation (RPA) to integrate the development operations (DevOps) ecosystem with information technology service management (ITSM) tools. This tool harnesses the predictive capabilities of AI and ML to foresee business disruptions or failures before they occur, thereby significantly mitigating change of failure or loss.

Further, this tool is designed to provide end-to-end automation for incident and change management processes. It can implement, rollback, and fix break-fix issues with efficiency and accuracy, thus enhancing operational functionality. As part of its own functionalities, this tool links with DevOps tools to monitor the release calendar, gathers testing feedback, and subsequently sends notifications to all stakeholders, thereby facilitating informed decision-making for production deployment.

In addition, the tool continuously observes the performance of released features or bug fixes and incidents. It automatically creates a defect report within the DevOps ecosystem and alerts the DevOps team if any issue arises. Therefore, this tool not only serves as a bridge between ITSM and DevOps but also acts as an active monitoring and alert system, enhancing both productivity and service reliability.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
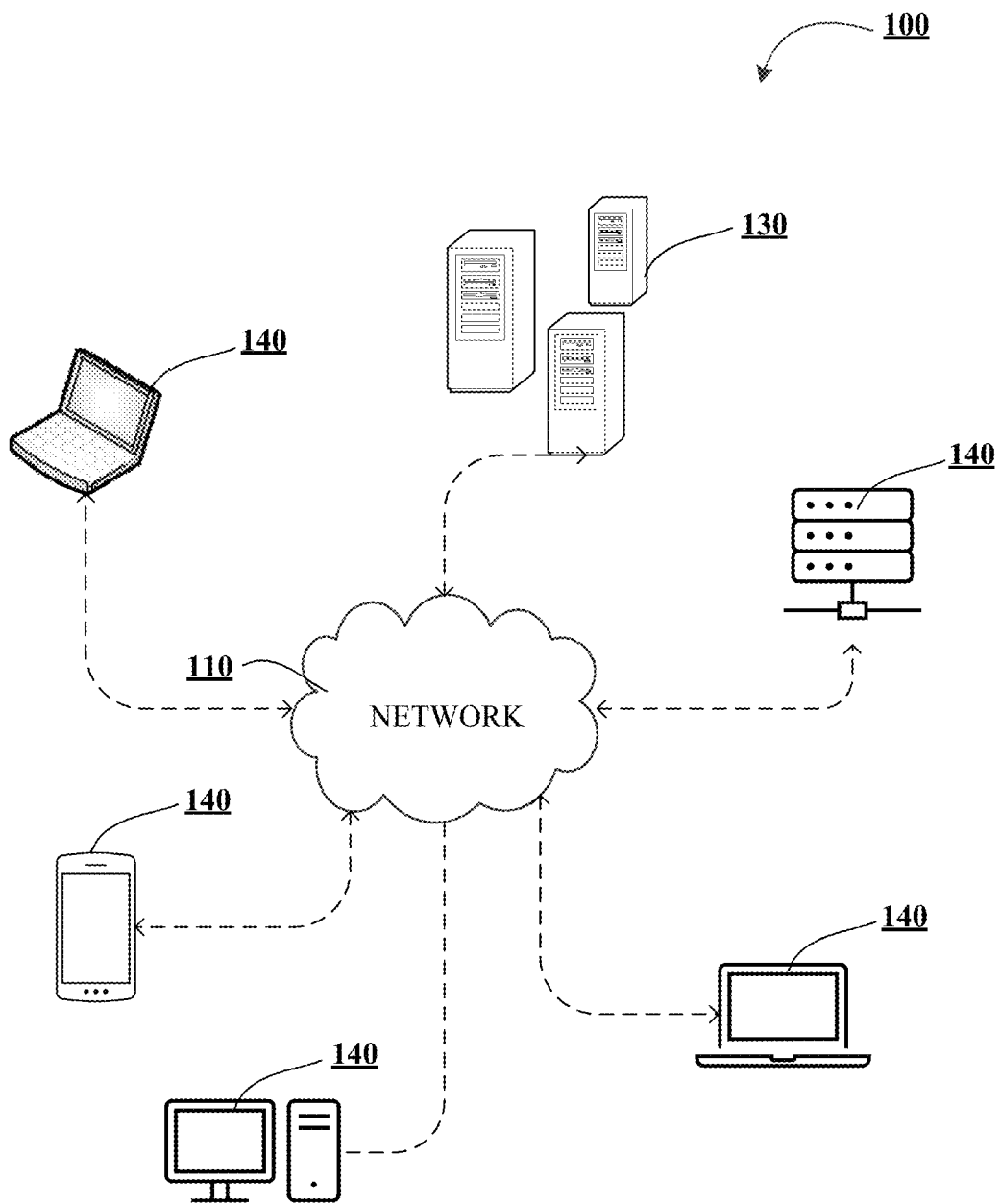
Figure 1B:
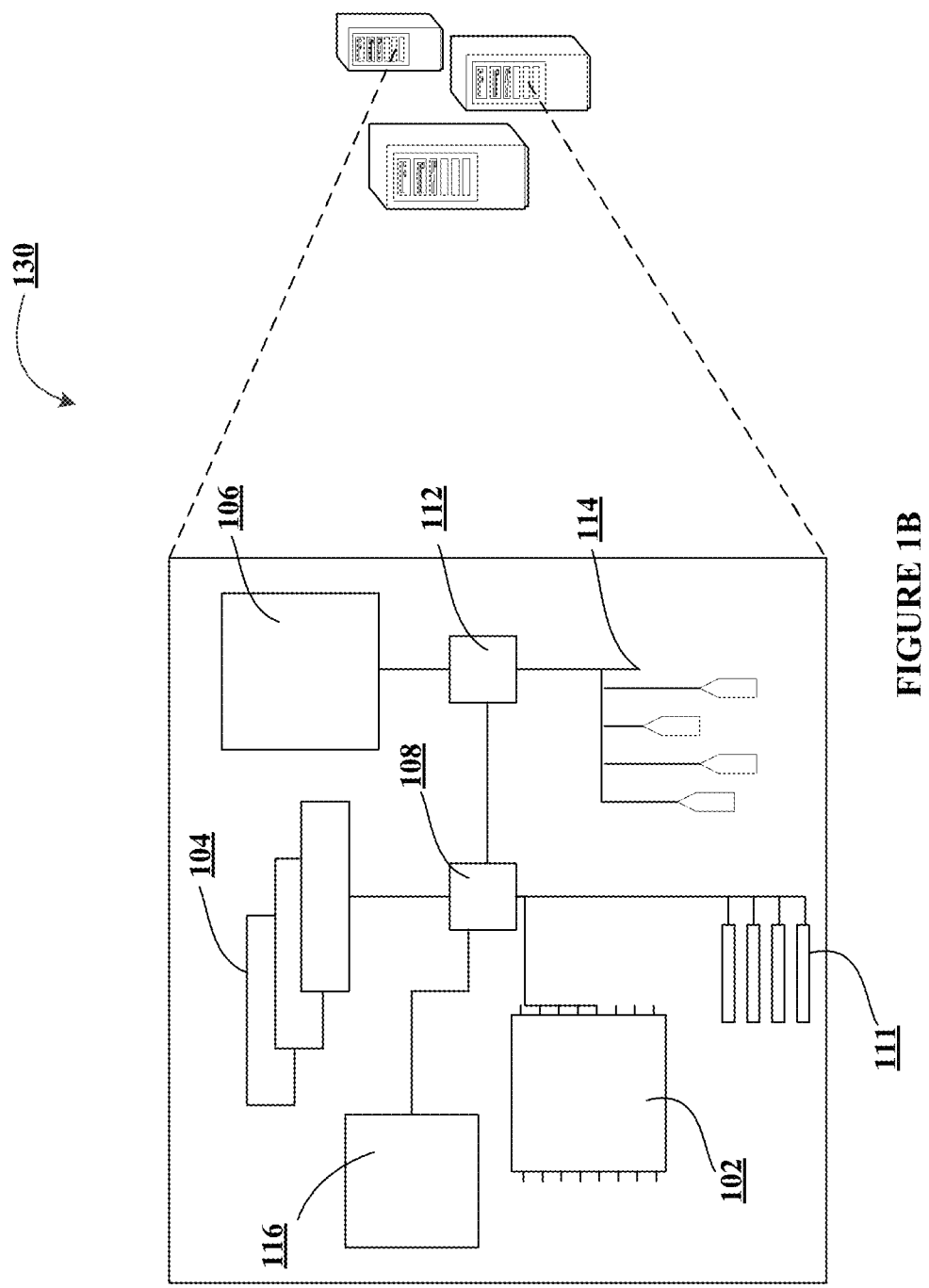
Figure 1C:
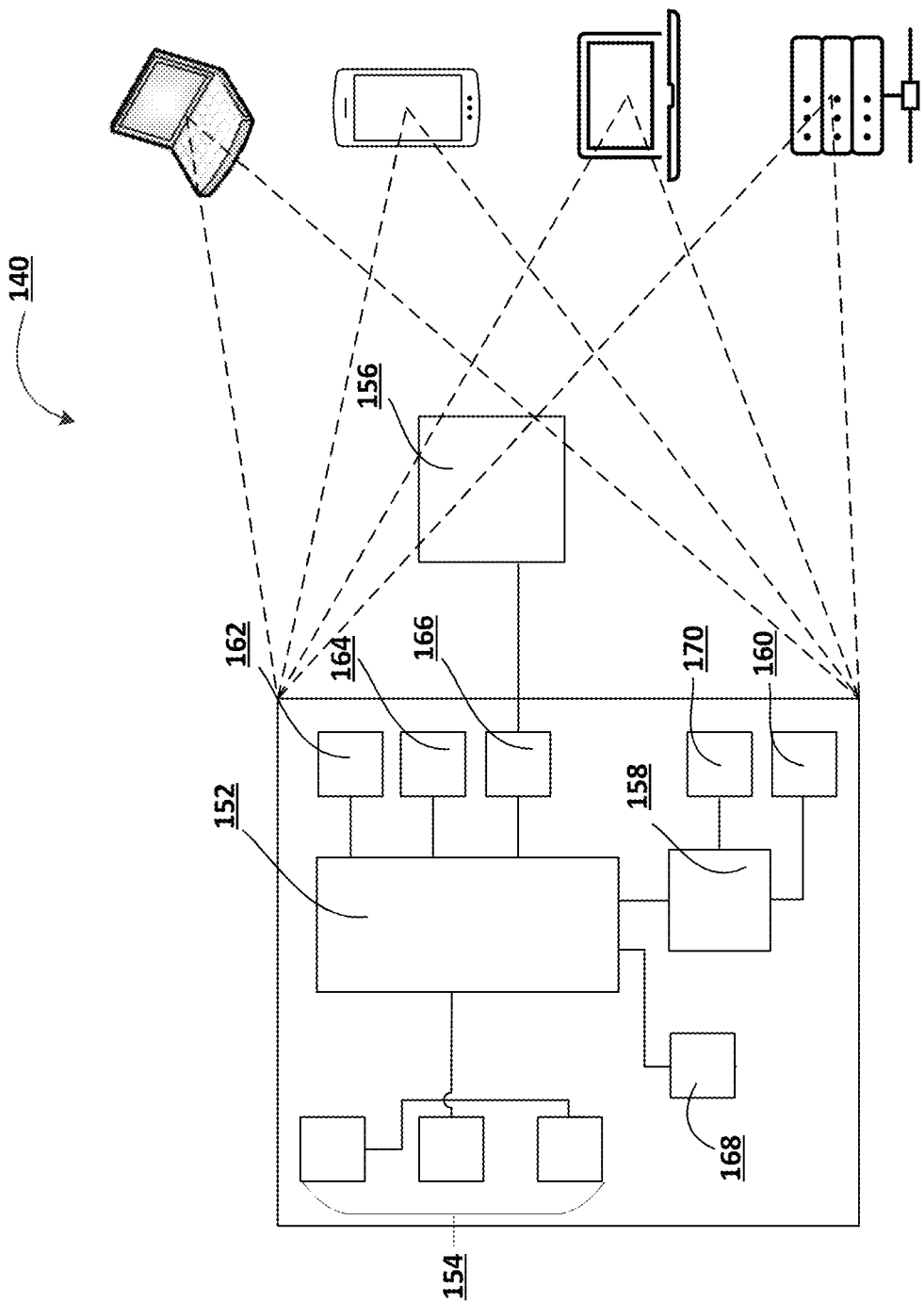
Figure 2:
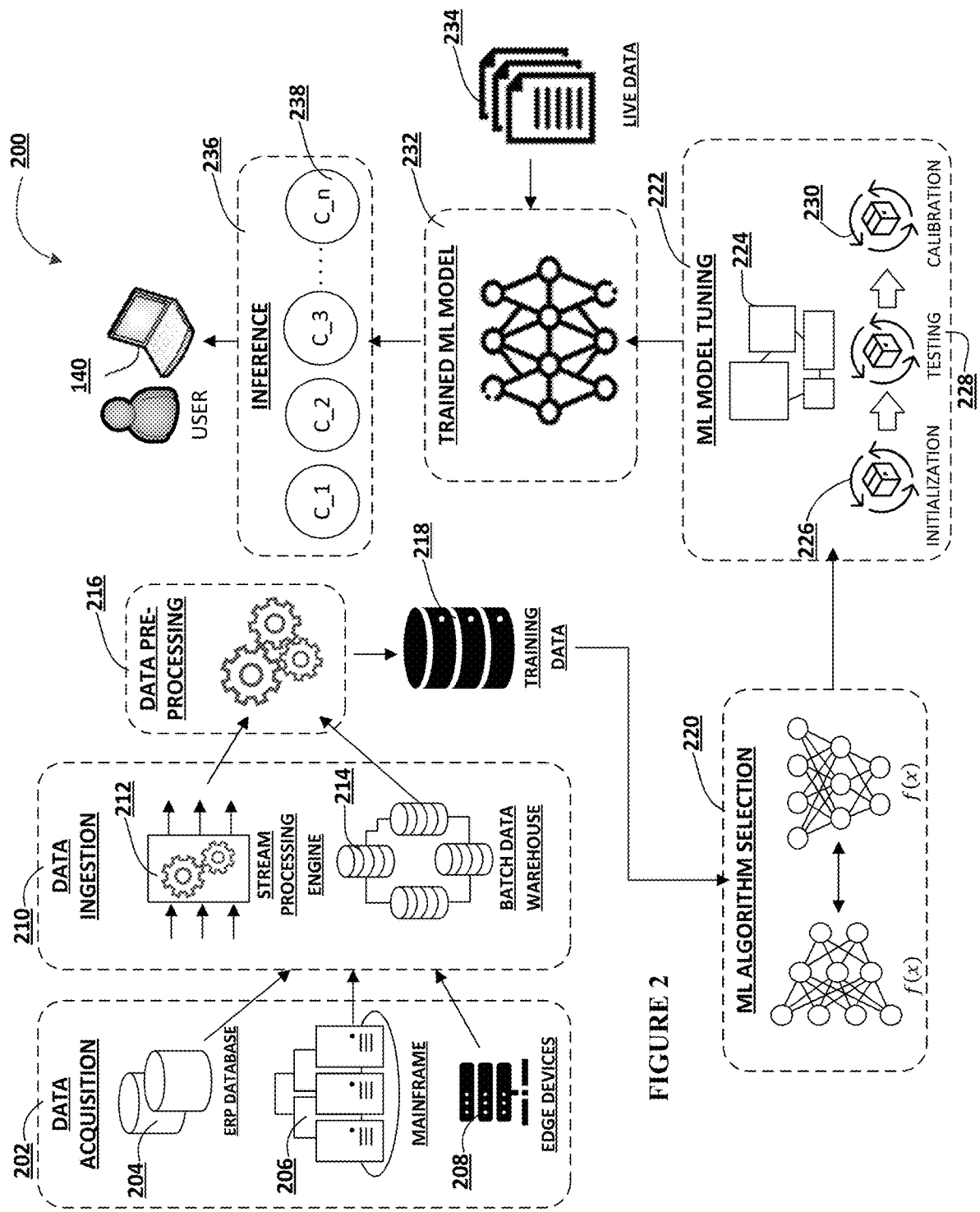
Figure 3A:
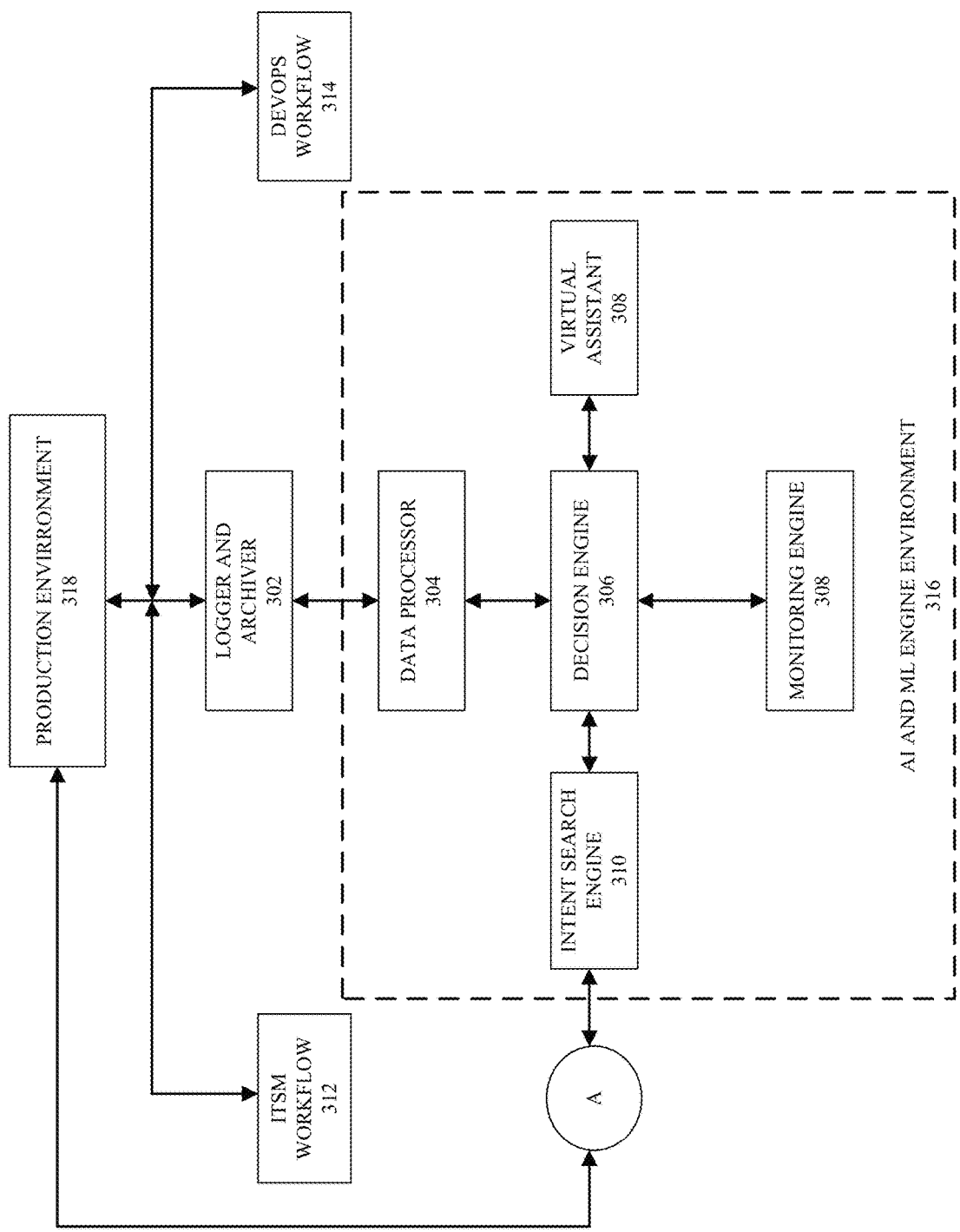
Figure 3B:
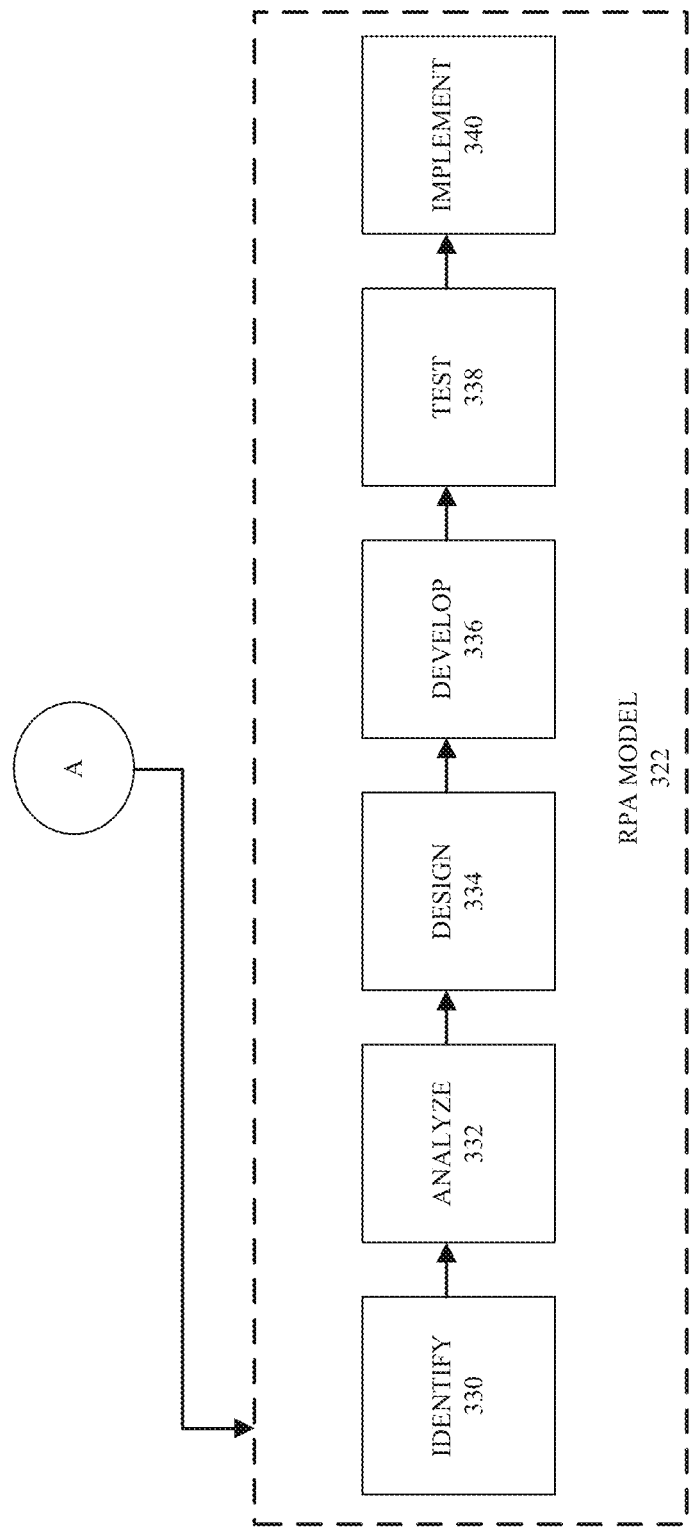

FIGS. 1A-1C illustrate technical components of an exemplary distributed computing environment 100 for end-to-end automation of network infrastructure development changes, in accordance with an embodiment of the disclosure;

FIG. 2 illustrates an exemplary machine learning (ML) subsystem architecture 200, in accordance with an embodiment of the invention; and FIGS. 3A-3B illustrate an architecture diagram for end-to-end automation of network infrastructure development changes, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Example embodiments of the present disclosure relate to systems and methods for end-to-end automation of network infrastructure development changes. Systems, methods, and computer program products are provided for end-to-end automation of network infrastructure development changes. in a continually expanding service industry of information technology, developers currently employ both information technology service management (ITSM), which are a set of industry standards, and development operations (DevOps), which are a robust framework for development. However, these two methodologies often fail to work in harmony. DevOps, known for its agility and flexibility, revolutionizes traditional IT approaches. Conversely, ITSM enforces a disciplined strategy and meticulous processes to guarantee foolproof deployment.

The turn around time (TAT), which refers to the period necessary to complete a process or fulfill a request, varies significantly between the two methodologies. With ITSM's cautious and methodical approach, deploying new enhancements to customers often takes longer, leading to an extended time to market. On the other hand, the agility of DevOps allows for a faster TAT. By integrating the robust procedures of ITSM with the nimbleness of DevOps, the present invention creates a solution that offers best-in-class results and breaks down the existing barriers between ITSM and DevOps.

The present invention provides a tool that leverages artificial intelligence (AI), machine learning (ML), and robotic process automation (RPA) to integrate the development operations (DevOps) ecosystem with information technology service management (ITSM) tools. This tool harnesses the predictive capabilities of AI and ML to foresee business disruptions or failures before they occur, thereby significantly mitigating change of failure or loss.

Further, this tool is designed to provide end-to-end automation for incident and change management processes. It can implement, rollback, and fix break-fix issues with efficiency and accuracy, thus enhancing operational functionality. As part of its own functionalities, this tool links with DevOps tools to monitor the release calendar, gathers testing feedback, and subsequently sends notifications to all stakeholders, thereby facilitating informed decision-making for production deployment.

In addition, the tool continuously observes the performance of released features or bug fixes and incidents. It automatically creates a defect report within the DevOps ecosystem and alerts the DevOps team if any issue arises. Therefore, this tool not only serves as a bridge between ITSM and DevOps but also acts as an active monitoring and alert system, enhancing both productivity and service reliability.

As such, it is understood that the current landscape of the information technology service industry often uses two different methods for development: Information Technology Service Management (ITSM) and Development Operations (DevOps). ITSM, following a set of strict industry standards, offers a rigorous and disciplined approach to ensure flawless deployments. In contrast, DevOps provides agility and flexibility, revolutionizing traditional IT methods. While both these methodologies have their strengths, they often fail to coordinate well with each other, leading to longer time-to-market cycles when ITSM's cautious approach is used, or potential instability when DevOps' rapid agility is employed. This lack of harmony and synergy between these two methodologies is a significant issue facing the field.

The invention proposed here solves this challenge by seamlessly integrating ITSM and DevOps. This is achieved by developing a tool powered by artificial intelligence (AI), machine learning (ML), and robotic process automation (RPA) to create an end-to-end automated system for network infrastructure development changes. The tool effectively combines ITSM's meticulousness and DevOps' speed, ensuring fast turn-around times and flawless deployments. Furthermore, the AI and ML capabilities allow the system to anticipate potential disruptions or failures, significantly reducing the possibility of downtime. Additionally, the tool automates the entire process of incident and change management, monitors the performance of released features, and generates defect reports, enhancing productivity and service reliability. Therefore, this tool not only bridges the gap between ITSM and DevOps but also acts as a proactive monitoring and alert system, facilitating informed decision-making and smoother operations.

The present disclosure provides a technical solution to a technical problem in the field of network infrastructure development. The problem includes the lack of efficient coordination and integration between ITSM and DevOps methodologies, resulting in extended time-to-market cycles and potential service instability. This discord between the two methodologies impedes the seamless execution of IT processes, making the development and deployment of network infrastructure changes cumbersome and inefficient. The technical solution presented herein allows for an end-to-end automation of network infrastructure development changes by creating a bridge between ITSM and DevOps. By leveraging AI, ML, and RPA, the system anticipates potential disruptions, effectively manages incidents, and monitors the performance of released features, thereby enhancing productivity and service reliability. This solution is an improvement over existing solutions, primarily in terms of (i) reducing computing resources, as it combines and automates processes of both ITSM and DevOps, (ii) offering more accurate solutions, as it uses predictive capabilities of AI and ML to mitigate potential failures, (iii) improving speed and efficiency by removing manual input and waste from the solution's implementation, and (iv) determining an optimal amount of resources for implementation, thus reducing network traffic and load on existing computing resources. The technical solution described herein uses a comprehensive, computerized process to perform specific tasks that were not previously performed, such as proactive monitoring and alerting for incident management. In specific implementations, the solution bypasses a series of previously implemented steps, further conserving computing resources.

As such, the present invention addresses a long-standing problem in the field and provides a solution that is not only innovative but also efficient and reliable. The system's ingenuity partly lies in its combination of new technologies and efficiencies that surpass current industry standards. Leveraging artificial intelligence, machine learning, and robotic process automation, it brings a level of sophistication and speed to network infrastructure development changes that is unequalled.

The system's usability is underlined by its high level of automation and orchestration, which ensures efficient process flows between systems and teams. It improves multiple pre-existing processes and technologies significantly, making it a holistic solution that not only solves the current problem but also enhances overall productivity and service reliability. In terms of longevity, the design incorporates strongly supported cross-platform capable technologies or processes. This feature allows for easy integration of emerging technologies and new processes, ensuring the solution stays relevant and effective in the ever-evolving IT landscape. The administration costs are low, making it a sustainable solution for long-term use.

FIGS. 1A-1C illustrate technical components of an exemplary distributed computing environment 100 for end-to-end automation of network infrastructure development changes, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

The proposed system's use of Robotic Process Automation (RPA) for efficient feature extraction and selection from large datasets offers a transformative solution to the challenges of big data management. The RPA serves as an automated arm in the data pre-processing phase, significantly reducing the dimensionality of voluminous data. This efficiency enables the system to handle vast quantities of data with greater accuracy and speed, and it uses less computing resources than traditional methods. By leveraging this capability, the system offers a more manageable and precise overview of the original dataset. It also augments the agility of the system in responding to changes in the network infrastructure, thereby ensuring a proactive approach to infrastructure management.

RPA's efficiency is further showcased in the training of machine learning models. The system uses RPA to facilitate the fine-tuning of the machine learning model. This involves iterative cycles of experimentation, testing, and tuning, where the RPA automates these repetitive tasks, reducing the time required for model optimization. The RPA's role in automating hyperparameter variation across different iterations is critical in refining the performance of machine learning algorithms. As a result, it ensures the creation of a highly accurate machine learning model, while considerably reducing the computing resources required for its development.

The system incorporates RPA in deploying the trained machine learning models into an existing production environment for practical business decision-making. The RPA automates the deployment process, ensuring seamless integration of the model into live systems. It plays a vital role in using the model for making decisions based on live data, depending on the type of machine learning algorithm used. The RPA also automates the presentation of the classified outputs, labels, or groups to the user, providing them with insightful, data-driven decision-making tools. This automation results in a system that is not only efficient but also user-friendly, enhancing its potential for wide-scale adoption. Overall, the system's use of RPA propels it towards a level of operational efficiency and proactive network infrastructure management that is unparalleled in the current industry standards.

FIGS. 3A-3B depict an architecture diagram for end-to-end automation of network infrastructure development changes, in accordance with embodiments of the invention. FIG. 3A demonstrates the collaborative interactions between various components to ensure a seamless network infrastructure development process. At the core of this system, AI and ML engine environment 316 play a pivotal role, training machine learning models, and predicting potential business impacts based on historical data. In the first stage, logger and archiver 302 is responsible for collecting feature-logs and resource logs, event data, and archiving historical logs. This component serves as the primary data collection point for the system, aggregating all necessary data in a centralized location. It preserves a comprehensive history of system data, facilitating audits and providing a robust dataset for machine learning model training. Once the data is collected, it's processed by data processor 304. This component normalizes and bucketizes the data based on specific features. It analyzes events, correlates them to specific features, and identifies any differences in feature performance and resource utilization before and after deployment. It also maintains a history of processed data, providing valuable input for the AI models.

Decision engine 306 utilizes this processed data to build AI models, which analyze current feature logs, compare pre and post-deployment performance, and evaluate the overall impact on the production server. It uses historical data to predict potential business impacts, alerting respective teams about any predicted possibilities in advance. It categorizes and assigns possibility ratings based on the predictions of the AI model, ensuring proactive possibility management. Virtual assistant 308 works in tandem with the decision Engine 306, receiving continuous feedback from testing and notifying all stakeholders of the results. It checks release calendars for deployment dates, accesses feature logs and possibility information, and submits it to change request (CRQ). The virtual assistant 308 creates the CRQ and respective workflows, monitors the status of the CRQ, and informs all parties of any updates. After receiving the signal from the decision maker, it waits for deployment confirmation and updates records accordingly.

Simultaneously, the intent search engine 310 is responsible for word vectorization and predicting intent about issues and technologies. It passes data to the robotic process automation (RPA) model for further processing. Finally, the monitor component, which could be either ITSM workflow 312 or DevOps workflow 314, supervises the ITSM queue, and synchronizes it with DevOps. It notifies the DevOps team about any incidents and continuously monitors these incidents, updating the records as needed. This results in an automated, end-to-end, efficient network infrastructure development process that utilizes AI and ML technologies to optimize workflows and reduce negative outcome possibility.

FIG. 3B displays the RPA model 322, outlining an integral part of the system's automation process. This RPA model works in conjunction with the AI and ML engine to ensure seamless operation through a series of steps: identification, analysis, design, development, testing, and implementation. The first phase of the process is identification 330. During this stage, the system identifies the processes to be automated, drawing on the collective insights of team members and the capabilities of intelligent automation tools. This approach helps in formulating a clear understanding of the existing processes that can be optimized with automation. Once the processes are identified, they move to the data analysis phase 332. During this stage, the system critically analyzes the identified processes and their requirements. It also scrutinizes the events involved and determines the complexity of the automation. These insights are crucial in determining the feasibility and potential efficiency improvements of automating these processes. Following the analysis phase is the design stage 334. In this phase, an initial plan or process design document (PDD) is created. This document lists all the necessary steps, putting them in the order required by the workflow. Also, object modeling is performed, structuring the system's understanding of the tasks to be performed.

The RPA model then moves to the Development phase 336. This step uses RPA tools like UIPath and BluePrism to automate the processes end-to-end. Soft robots are readied to trigger the deployment, leading to the creation of an automated workflow. Next, the RPA model proceeds to the test phase 338. The soft robot is used for testing, mimicking human behavior to ensure the process runs as expected. Predictions about potential issues and technological requirements are made, ensuring that the automation is ready for deployment. Finally, the RPA model enters the implementation stage 340. The identified actions are implemented, and the respective stakeholders are notified of the changes. In addition, data is gathered during this phase for a post-implementation accuracy check. This ensures the RPA model's effectiveness and allows for any necessary adjustments or improvements. This implementation process reinforces the system's overall capacity to automate network infrastructure development changes, allowing it to operate more efficiently and accurately.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for end-to-end automation of network infrastructure development changes, the system comprising:
  a processing device;
  a non-transitory storage device containing instructions when executed by the processing device, causes the processing device to perform the steps of:
    collect and archive data comprising feature logs, resource logs, and events in a central historical data storage;
    normalize the data and correlate events to specific features, wherein correlating events to specific features comprises locating differences in pre and post-deployment feature performance, including resource utilization, and maintaining a history of the data in the central historical data storage;
    train an artificial intelligence (AI) model to further analyze the feature logs and compare the feature logs to pre-deployment performance to check overall impact on a production server resource utilization;
    predict an impact based on historical data and assign a probability rating of an incident based on AI model analysis;
    employ a virtual assistant to receive continuous feedback from a deployment and update records upon a deployment confirmation;
    track, via a data monitor, an information technology service management (ITSM) queue and sync the ITSM queue with a development operations (DevOps) queue, informing a DevOps team for the probability rating of the incident; and employ a robotic process automation (RPA) model for the steps of identification, analysis, design, development, testing, and implementation and automate an end-to-end process.

2. The system of claim 1, wherein the data monitor continuously monitors one or more incidents and updates records in the central historical data storage.

3. The system of claim 1, wherein the virtual assistant further comprises a conflict resolution module that manages scheduling conflicts in deployment dates of release calendars.

4. The system of claim 1, wherein the step of normalizing the data further includes the use of machine learning techniques for automated anomaly detection in the feature logs and resource logs.

5. The system of claim 1, wherein the step of predicting an impact further includes determining potential business impacts, such as downtime, revenue loss, or impact on customer experience, and providing these predictions to one or more users.

6. The system of claim 1, wherein the step of employing a virtual assistant further includes using natural language processing techniques for interpreting and generating human-like textual responses.

7. A computer program product for end-to-end automation of network infrastructure development changes, the computer program product comprising a non-transitory computer-readable medium comprising code causing an apparatus to:

collect and archive data comprising feature logs, resource logs, and events in a central historical data storage;

normalize the data and correlate events to specific features, wherein correlating events to specific features comprises locating differences in pre and post-deployment feature performance, including resource utilization, and maintaining a history of the data in the central historical data storage;

train an artificial intelligence (AI) model to further analyze the feature logs and compare the feature logs to pre-deployment performance to check overall impact on a production server resource utilization;

predict an impact based on historical data and assign a probability rating of an incident based on AI model analysis;

employ a virtual assistant to receive continuous feedback from a deployment and update records upon a deployment confirmation; and track, via a data monitor, an information technology service management (ITSM) queue and sync the ITSM queue with a development operations (DevOps) queue, informing a DevOps team for the probability rating of the incident;

wherein the code further causes the apparatus to: employ a robotic process automation (RPA) model for the steps of identification, analysis, design, development, testing, and implementation and automate an end-to-end process.

8. The computer program product of claim 7, wherein the data monitor continuously monitors one or more incidents and updates records in the central historical data storage.

9. The computer program product of claim 7, wherein the virtual assistant further comprises a conflict resolution module that manages scheduling conflicts in deployment dates of release calendars.

10. The computer program product of claim 7, wherein the step of normalizing the data further includes the use of machine learning techniques for automated anomaly detection in the feature logs and resource logs.

11. The computer program product of claim 7, wherein the step of predicting an impact further includes determining potential business impacts, such as downtime, revenue loss, or impact on customer experience, and providing these predictions to one or more users.

12. The computer program product of claim 7, wherein the step of employing a virtual assistant further includes using natural language processing techniques for interpreting and generating human-like textual responses.

13. A method for end-to-end automation of network infrastructure development changes, the method comprising:

collecting and archive data comprising feature logs, resource logs, and events in a central historical data storage;

normalizing the data and correlate events to specific features, wherein correlating events to specific features comprises locating differences in pre and post-deployment feature performance, including resource utilization, and maintaining a history of the data in the central historical data storage;

training an artificial intelligence (AI) model to further analyze the feature logs and compare the feature logs to pre-deployment performance to check overall impact on a production server resource utilization;

predicting an impact based on historical data and assign a probability rating of an incident based on AI model analysis;

employing a virtual assistant to receive continuous feedback from a deployment and update records upon a deployment confirmation;

tracking, via a data monitor, an information technology service management (ITSM) queue and sync the ITSM queue with a development operations (DevOps) queue, informing a DevOps team for the probability rating of the incident; and employing a robotic process automation (RPA) model for the steps of identification, analysis, design, development, testing, and implementation and automate an end-to-end process.

14. The method of claim 13, wherein the data monitor continuously monitors one or more incidents and updates records in the central historical data storage.

15. The method of claim 13, wherein the virtual assistant further comprises a conflict resolution module that manages scheduling conflicts in deployment dates of release calendars.

16. The method of claim 13, wherein the step of normalizing the data further includes the use of machine learning techniques for automated anomaly detection in the feature logs and resource logs.

17. The method of claim 13, wherein the step of predicting an impact further includes determining potential business impacts, such as downtime, revenue loss, or impact on customer experience, and providing these predictions to one or more users.

18. The method of claim 13, wherein the step of employing a virtual assistant further includes using natural language processing techniques for interpreting and generating human-like textual responses.

* * * * *